(12) United States Patent
Weber

(10) Patent No.: US 8,091,943 B1
(45) Date of Patent: Jan. 10, 2012

(54) APPARATUS AND METHOD FOR ACCESSING THE BED OF A PICKUP TRUCK

(76) Inventor: Robert M. Weber, Wasilla, AK (US)

( * ) Notice: Subject to any disclaimer, the term of this patent is extended or adjusted under 35 U.S.C. 154(b) by 305 days.

(21) Appl. No.: 12/175,448

(22) Filed: Jul. 17, 2008

Related U.S. Application Data

(60) Provisional application No. 60/959,724, filed on Jul. 17, 2007.

(51) Int. Cl.
B60R 3/02 (2006.01)
(52) U.S. Cl. .......................................... 296/62; 280/166
(58) Field of Classification Search .................. 105/447; 182/77, 91, 127, 156; 280/163, 164.1, 166; 296/50, 57.1, 62, 106
See application file for complete search history.

(56) References Cited

U.S. PATENT DOCUMENTS

| | | | | |
|---|---|---|---|---|
| 1,223,639 A | * | 4/1917 | Swartel | 296/62 |
| 3,606,382 A | * | 9/1971 | Pollock | 280/166 |
| 3,853,369 A | * | 12/1974 | Holden | 296/62 |
| 3,865,399 A | * | 2/1975 | Way | 280/166 |
| 3,889,997 A | * | 6/1975 | Schoneck | 296/62 |
| 4,161,997 A | * | 7/1979 | Norman | 182/93 |
| 6,966,597 B2 | * | 11/2005 | Tegtmeier | 296/62 |
| 6,971,478 B2 | * | 12/2005 | Bareket | 182/127 |
| 7,073,837 B2 | * | 7/2006 | Madlinger | 296/57.1 |
| 7,240,947 B2 | * | 7/2007 | Kuznarik et al. | 296/62 |
| 2002/0070577 A1 | * | 6/2002 | Pool et al. | 296/62 |

* cited by examiner

Primary Examiner — Glenn Dayoan
Assistant Examiner — Paul Chenevert
(74) Attorney, Agent, or Firm — R. Randall Frisk

(57) ABSTRACT

An apparatus for accessing the bed of a pickup truck having a frame, a rear bumper and a tailgate having a distal edge and being hingedly mounted to the frame includes a lower linkage assembly having proximal and distal ends and being pivotally mounted at its proximal end to the rear truck bumper at a first axis; an upper linkage assembly having proximal and distal ends and being pivotally mounted at its proximal end to and proximal the distal edge of the truck tailgate at a second axis, and being pivotally mounted at its distal end to the distal end of the lower linkage assembly at a third axis; a step connected to the lower linkage assembly; and, wherein the distance between the first and second axes is an effective length $L_B$, the distance between the second and third axes is an effective length $L_T$, and the distance between the first and third axes is an effective length $L_S$, and wherein the ratio of $L_S$ to $L_T$ to $L_B$ to is approximately 2.9 to 1.8 to 4.5.

15 Claims, 6 Drawing Sheets

APPARATUS AND METHOD FOR ACCESSING THE BED OF A PICKUP TRUCK

REFERENCE TO RELATED APPLICATIONS

The present application claims the benefit of U.S. Provisional Patent Application Ser. No. 60/959,724, filed Jul. 17, 2007 entitled "Tailgate Helper", which is hereby incorporated by reference in its entirety.

FIELD OF THE INVENTION

The present invention relates to steps, and more particularly to a folding step for accessing the bed of a pickup truck.

BACKGROUND OF THE INVENTION

Pickup trucks have beds which are accessible through a tailgate hingedly mounted at the rear of the truck. When the tailgate is lowered to the open, generally horizontal position, it is about three feet or more above the ground, making it difficult and awkward for a person to climb up into the truck bed. This is especially troublesome when one or more persons are in the process of loading a large or heavy object into the truck bed. Numerous step assemblies have been devised to facilitate access to a truck bed or similar structure, examples of which are disclosed in the following patents and patent publication:

| Pat. No. | Inventor |
| --- | --- |
| 7,240,947 | Kuznarik et al. |
| 7,073,837 | Madlinger |
| 6,966,597 | Tegtmeier |
| 4,161,997 | Norman |
| 3,889,997 | Schoneck |
| 3,865,399 | Way |
| 1,223,639 | Swartsel |
| Patent Publication No. | |
| 2002/0070577 | Pool, III et al. |

These and other assemblies are less than optimal, often being expensive, cumbersome, heavy, view obstructing, unstable and/or difficult to operate. Improvements are continually being sought.

SUMMARY OF THE INVENTION

An apparatus for accessing the bed of a pickup truck having a frame, a rear bumper and a tailgate having a distal edge and being hingedly mounted to the frame includes a lower linkage assembly having proximal and distal ends and being pivotally mounted at its proximal end to the rear truck bumper at a first axis; an upper linkage assembly having proximal and distal ends and being pivotally mounted at its proximal end to and proximal the distal edge of the truck tailgate at a second axis, and being pivotally mounted at its distal end to the distal end of the lower linkage assembly at a third axis; a step connected to the lower linkage assembly; and, wherein the distance between the first and second axes is an effective length $L_B$, the distance between the second and third axes is an effective length $L_T$, and the distance between the first and third axes is an effective length $L_S$, and wherein the ratio of $L_S$ to $L_T$ to $L_B$ to is approximately 2.9 to 1.8 to 4.5.

It is an object of the present invention to provide an improved apparatus for accessing the bed of a pickup truck.

Other objects and advantages of the present invention will become apparent from the following description of the preferred embodiment.

DESCRIPTION OF THE SELECTED EMBODIMENT

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, systems or devices, and any further applications of the principles of the invention as described herein, are contemplated as would normally occur to one skilled in the art to which the invention relates.

Figure 1:
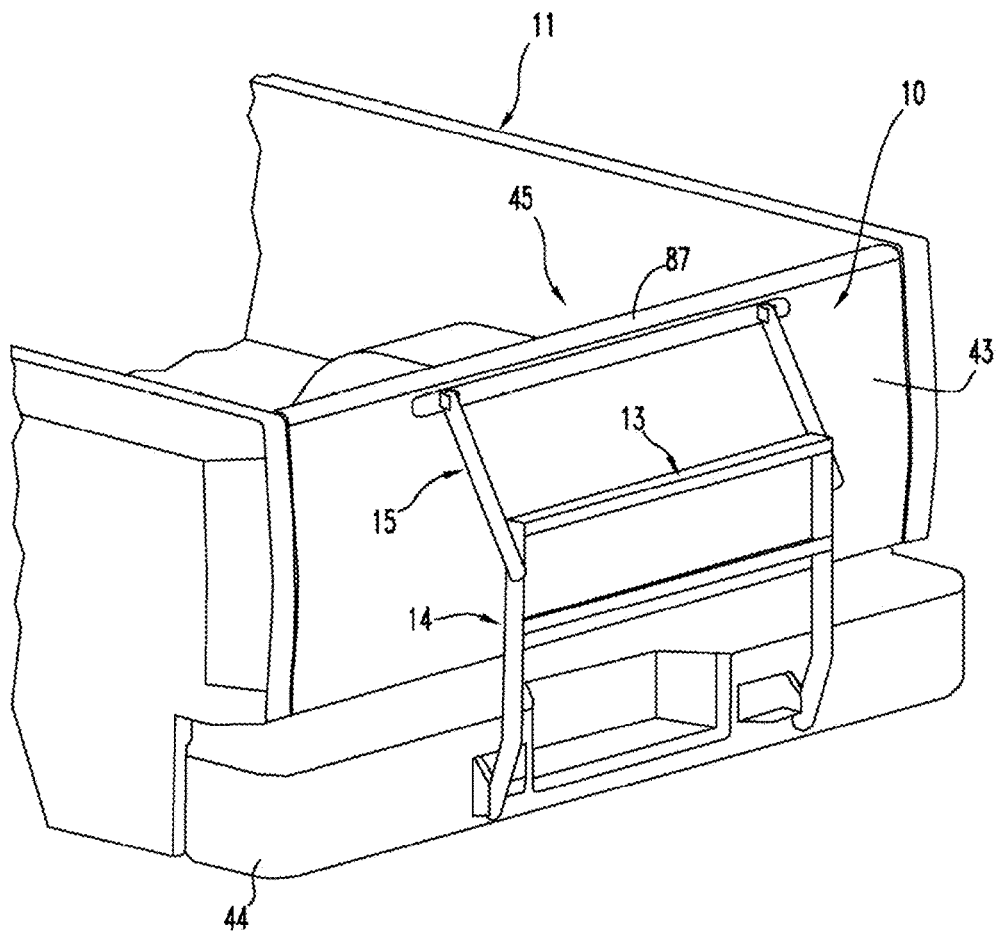
FIG. 1 is a perspective view of an apparatus 10 for accessing the bed of a pickup truck in accordance with one embodiment of the present invention, and showing apparatus 10 mounted to the truck 11 and in the up, closed position 45.
Figure 2:
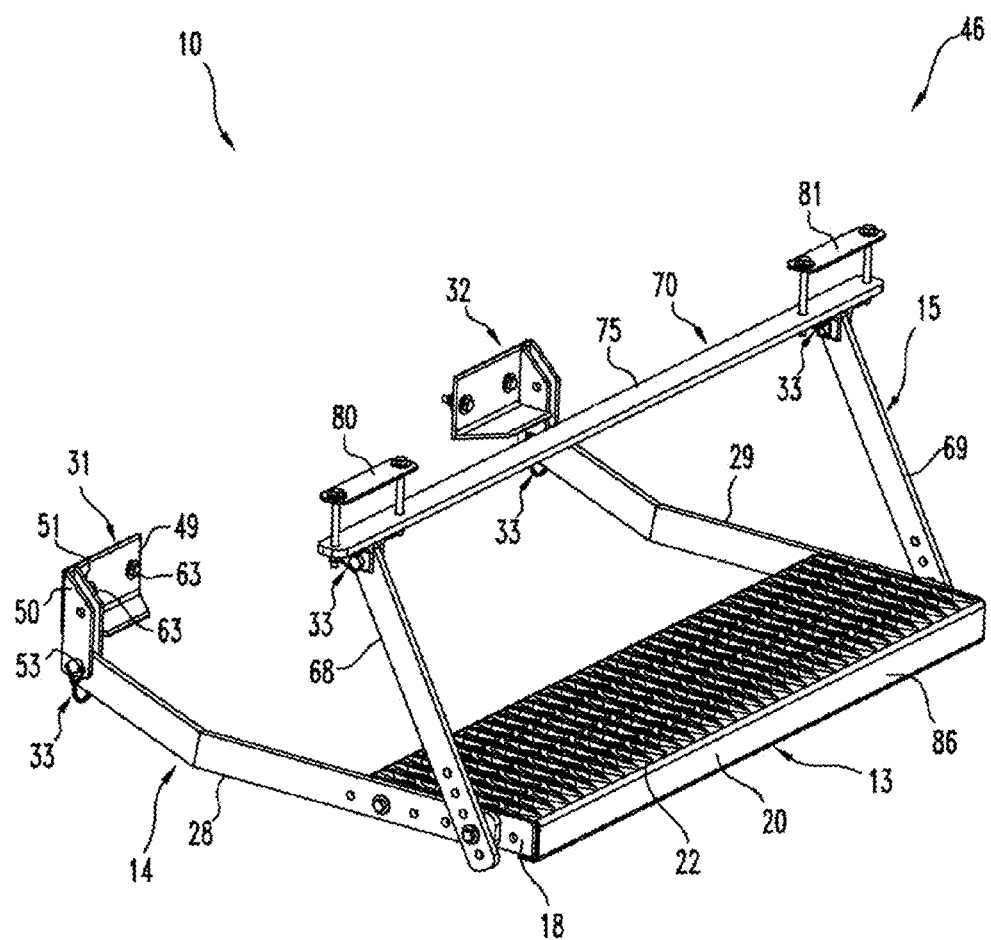
FIG. 2 is a perspective view of the apparatus 10 for accessing the bed of a pickup truck of FIG. 1, and showing apparatus 10 in the down, open position 46.
Figure 7:
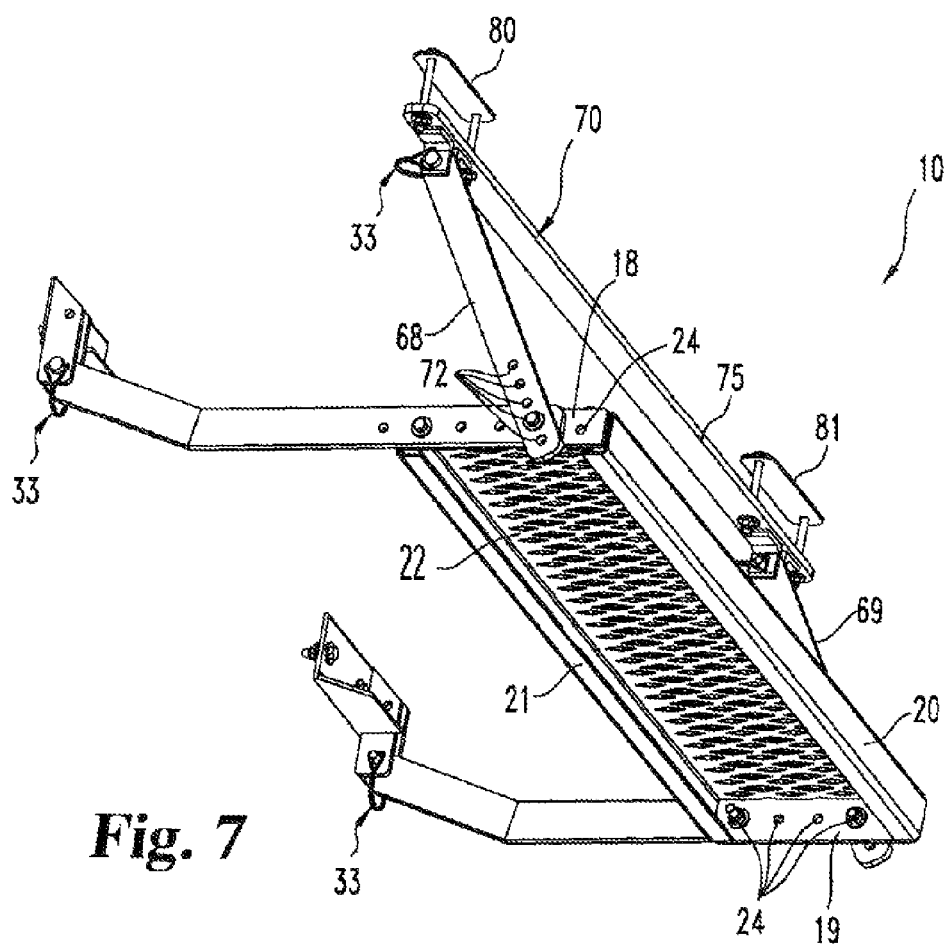
FIG. 7 is a perspective view of the apparatus 10 of FIG. 2 showing the underside of the apparatus 10.
Figure 8:
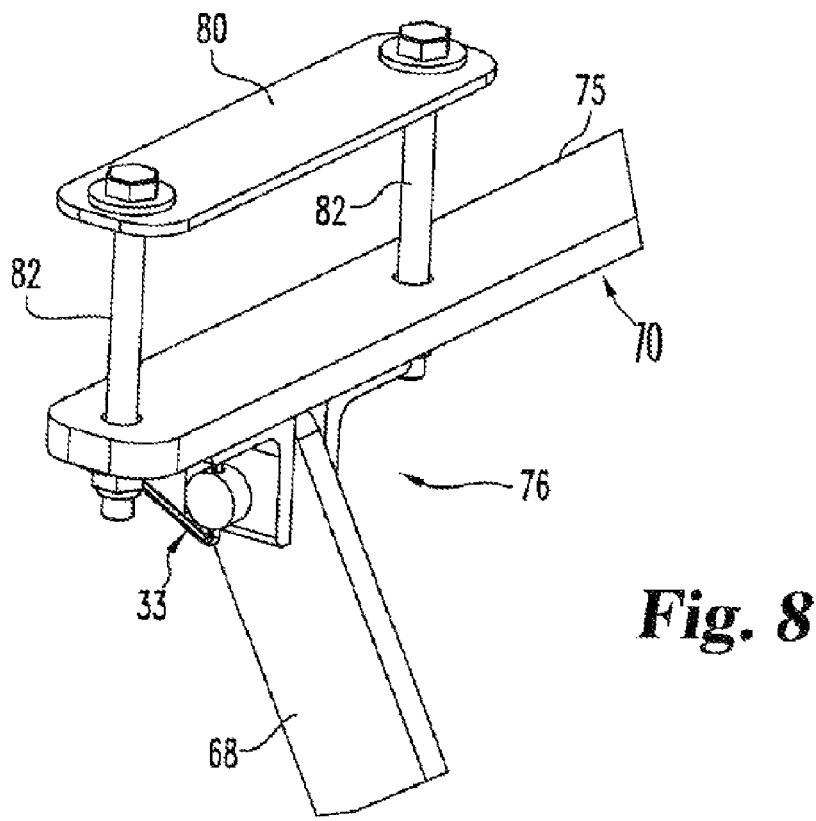
FIG. 8 is an enlarged perspective view of the left side of the tailgate mounting assembly 70 of the apparatus 10 of FIG. 2.
Figure 9:
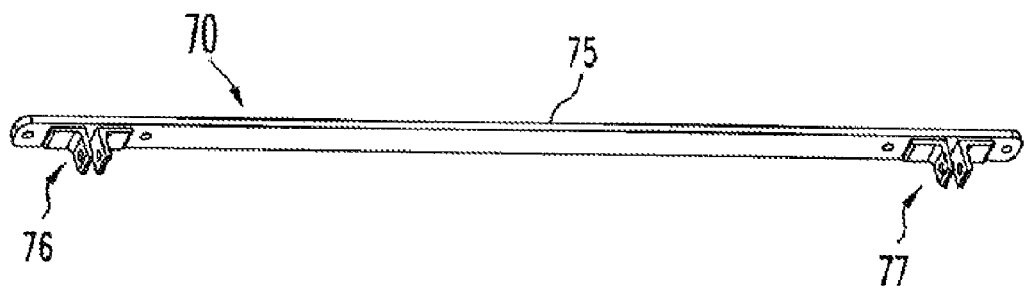
FIG. 9 is a perspective view of the mounting bar 75 of the tailgate mounting assembly 70 of the apparatus 10 of FIG. 2.

Referring to FIGS. 1, 2 and 7, there is shown an apparatus 10 for accessing the bed of a pickup truck 11 in accordance with the present invention. Apparatus 10 generally comprises a step 13, a lower linkage assembly 14 and an upper linkage assembly 15. Step 13 is generally rectangular with opposing side members 18 and 19, front and rear members 20 and 21, and a stair tread 22 supported thereabove. Stair tread 22 has a diamond or any desirable pattern to provide a sure and non-slip grip. Side members 18 and 19 each define a plurality of holes (as at 24) to provide variable mounting of step 13 to upper and lower linkage assemblies 14 and 15.

Figure 4:
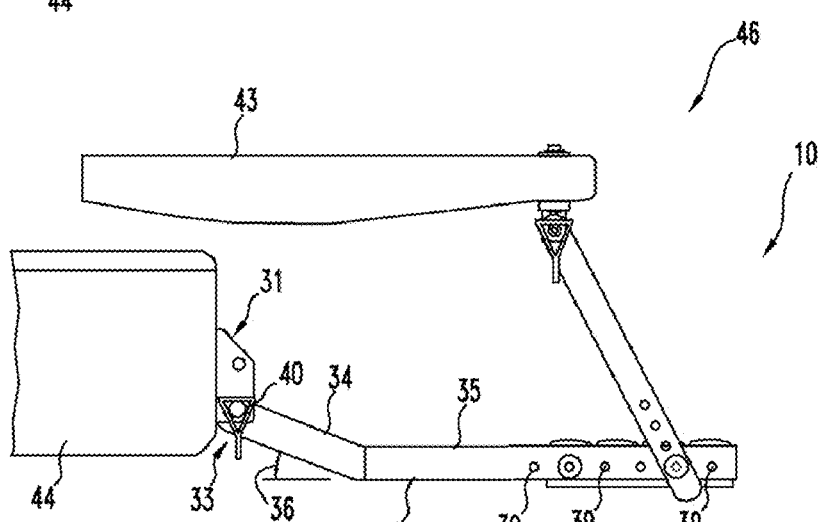
FIG. 4 is a side, elevational view of the apparatus 10 for accessing the bed of a pickup truck of FIG. 1, and showing the apparatus 10 in the down, open position 46.
Figure 5:
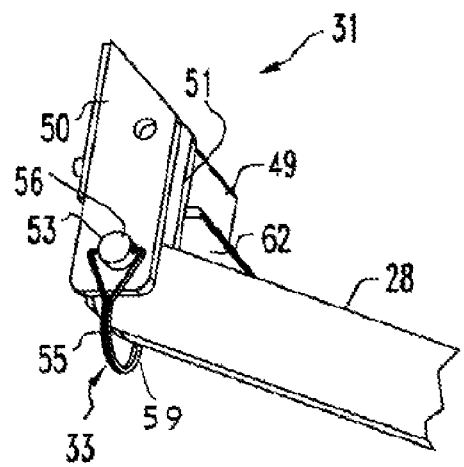
FIG. 5 is an enlarged perspective view of the left arm mount 31 of the apparatus 10 of FIG. 4.
Figure 6:
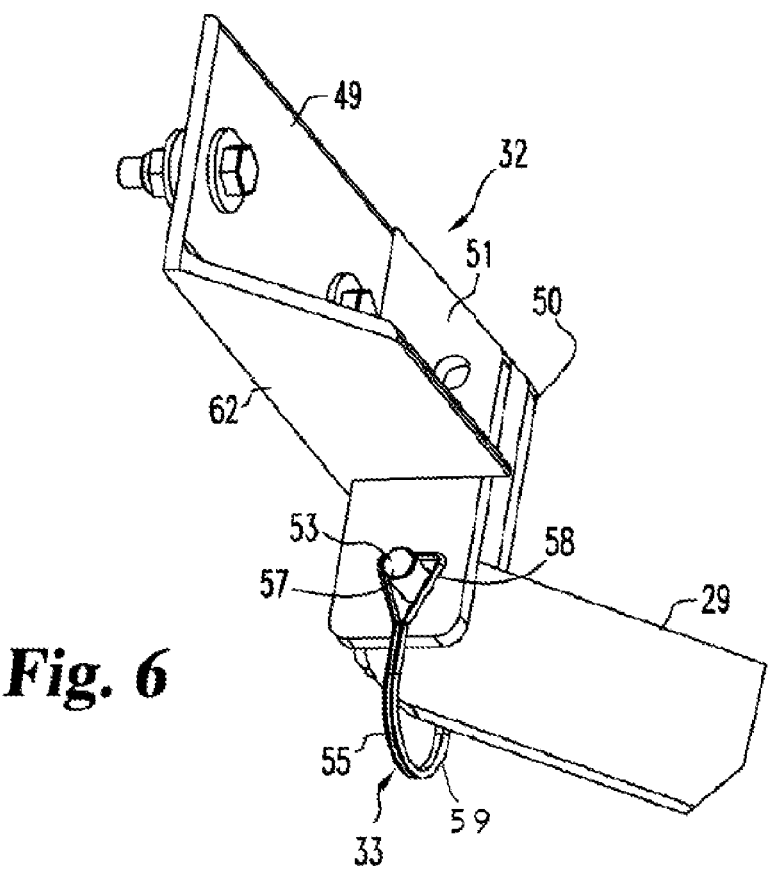
FIG. 6 is a perspective view of the right arm mount 32 of the apparatus 10 of FIG. 4.

Lower linkage assembly 14 includes identical left and right step arms 28 and 29, left and right arm mounts 31 and 32, and quick release pin assemblies 33. Referring to FIG. 4, left arm 28 includes a mounting section 34 and a step section 35 that extends at a lift advantage angle 36 of approximately 20 degrees relative to mounting section 34. At its distal end, step section 35 defines a plurality of mounting holes 39 (here, six holes) for variable connection with step 13 and with upper linkage assembly 15. At its proximal end, mounting section 34 defines a hole 40 for mounting to a corresponding arm mount 31/32.

The truck 11 is typical of pickup trucks and has a frame (not shown), a tailgate 43 and a rear bumper 44. Tailgate 43 is hingedly connected to the frame of truck 11 to move between an up, closed position 45 (FIGS. 1 and 3) and a lowered, open position 46 (FIG. 4). Bumper 44 extends rearwardly of the tailgate 43 when tailgate 43 is in the up, closed position. In the lowered, open position 46, tailgate 43 is pivoted about its hinge (not shown) to a generally horizontal position (FIG. 4) whereby the majority of tailgate 43 extends rearwardly of bumper 44.

Referring to FIGS. 2 through 6, left and right arm mounts 31 and 32 are mirror images of each other. Left arm mount 31 includes a back plate 49 and a pair of shackle plates 50 and 51, between which extends the proximal end of left step arm 28. Through aligned holes in step arm 28 and shackle plates 50 and 51 extends a quick release pin 53 of quick release pin assembly 33. A spring load keep 55 is pivotally held by the head 56 of pin 53 and loops therefrom around to the opposing end 57 of pin 53 where its triangular loop 58 is pulled, against the bias of the lower loop 59 of keep 55, over the protruding end 57 of pin 53. Pin 53 is thereby securely held in place as an axle about which left step arm 28 pivots relative to left arm mount 31. Right step arm 29 is similarly mounted and pivots relative to right arm mount 32. Each of arm mount 31 and 32 is also provided with strengthening gussets 62. Left and right arm mounts 31 and 32 are securely attached to the bumper 44 by bolts 63 or any other suitable connecter. The lower linkage assembly 14 can thus be easily and securely connected with and removed from bumper 44 via the quick connect assemblies 33.

Referring to FIGS. 2, 4 and 7 through 9, upper linkage assembly 15 includes left and right tailgate arms 68 and 69, tailgate mounting assembly 70, and quick release pin assemblies 33. Left and right tailgate arms 68 and 69 are identical and are generally straight links, each defining at its proximal end a hole 71 to mount to tailgate mounting assembly 70 and, at its distal end, a plurality of holes (72) to mount to lower linkage assembly 14 and step 13. First mounting means includes at least one or both of (1) the plurality of mounting holes 39 in lower linkage assembly 14 and (2) the plurality of mounting holes 72 in upper linkage assembly 15. Second mounting means includes at least one or both of (1) the plurality of mounting holes 39 in lower linkage assembly 14 and (2) the plurality of mounting holes 24 in step 13. A plurality means two or more.

Tailgate mounting assembly 70 includes a mounting bar 75 with opposing left and right pairs of shackle plates 76 and 77, which pivotally receive therein the proximal ends of left and right tailgate mounting arms 68 and 69, respectively. Mounting arms 68 and 69 are pivotally held between the pairs of shackle plates 76/77 by quick release pin assemblies 33, as are used to mount lower linkage assembly 14 to bumper 44. Mounting bar 75 is secured to the upper edge of tailgate 43 by bolts or any other suitable connecters to ensure a solid and fixed, but removable connection. Alternative embodiments contemplate mounting bar 75 and/or arm mounts 31 and 32 being permanently connected to the vehicle. Where the tailgate or similar vehicle structure is made of a sufficiently strong material such as steel, bolts through mounting bar 75 are sufficient to achieve a solid and reliable connection. If the tailgate is made of a weaker material such as aluminum, back plates 80 and 81 are positioned on the inside of tailgate 43, and the securing bolts 82 extend therethrough, as well.

Figure 3:
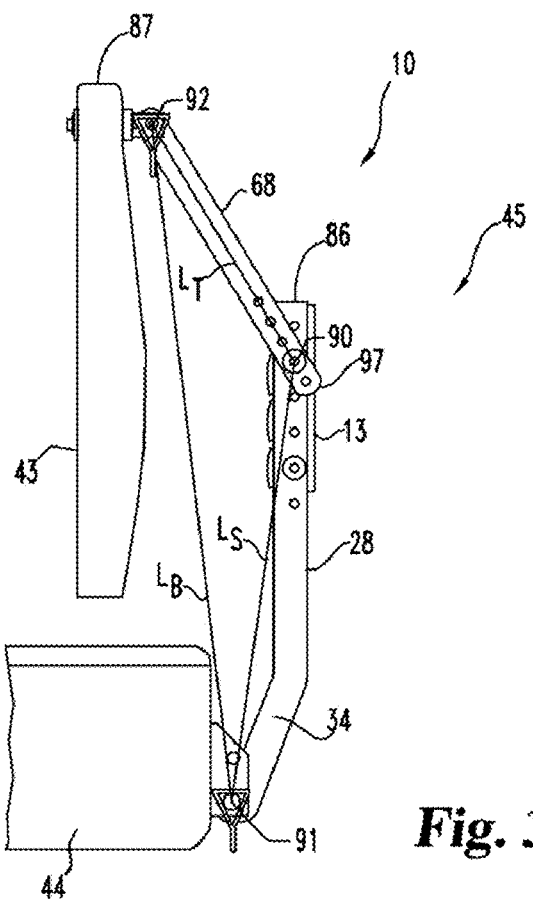
FIG. 3 is a side, elevational view of the apparatus 10 for accessing the bed of a pickup truck of FIG. 1.

In assembly and in the upper, closed position 45, apparatus 10 is characterized in that the distal edge 86 of step 13 is below the distal edge 87 (and in this closed position 45, it is the upper edge) of tailgate 43. That is, apparatus 10 poses no obstruction to the view from the vehicle cab over the top of the closed tailgate and does not obstruct access directly over the top of the tailgate. In one embodiment, the effective length $L_S$ of the identical step arms 28 and 29 (e.g. the assembled length as measured from the axes of their pivotal connections, i.e. from pin 90 to pin 91 in FIG. 3) to the effective length $L_T$ of the identical tailgate arms 68 and 69 (from their pivot connection at pins 90 and 92) to the effective length $L_B$ of the bumper to tailgate connection (from their pivot connections at pins 91 and 92) is approximately 2.9 to 1.8 to 4.5. This relationship results in the top distal edge of the step 13 being below the top edge of tailgate 43 in the up, closed position 45. In the down position, the step 13 is horizontal, and closing the apparatus 10 and tailgate 43 is made easier (in comparison to closing just the tailgate 43). This is due in part because the effective point of lifting by the user's hand is at the outer edge of the step 13, which is lower than the tailgate edge. For most adults, this lower range of lifting distributes the workload to not only the arms and shoulders (which bear the brunt of the lifting action when closing just a tailgate), but also to the legs and back, each body area sharing a smaller overall lifting force, and the lifting action is made easier. This relationship is contemplated to be distributed differently for different vehicles where the tailgate and bumper distance is different. However, the mounting locations of the arm mounts 31/32 and tailgate mounting assembly 70 is contemplated to be made so that the distal edge 86 of step 13 is not only below the upper edge 87, but as much as 7 to 10 inches below the upper edge 87, as shown in FIG. 3.

As seen in FIG. 4, the step 13 is mostly, though not entirely rearwardly of the distal edge 87 of tailgate 43 in the lowered, open position 46. Also in the lowered, open position, as shown in FIG. 4, the left and right tailgate arms 68 and 69 pivotally connect with the left and right step arms 28 and 29 at an angle of about 60 degrees and proximal the distal edge of step 13. Also, in the up, closed position 45, apparatus 10 has a very narrow profile. That is the rearmost surface 97 of apparatus 10 (which may be the distal end of arm 68 or the bottom of step 13) is minimized, essentially extending rearwardly of the mounting at pin 91 approximately only the distance equal to the length of mounting section 34 times the sine of the lift advantage angle 36.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for accessing the bed of a pickup truck having a frame, a rear bumper and a tailgate having a distal edge and being hingedly mounted to the frame to move between an up, closed position and a lowered, open position, the apparatus comprising:

a lower linkage assembly having first and second ends and left and right step arms and being pivotally mounted at the first end to the rear truck bumper at a first axis;

an upper linkage assembly having third and fourth ends and left and right tailgate arms and being pivotally mounted at the third end to and proximal the distal edge of the truck tailgate at a second axis, and being pivotally mounted at the fourth end to the second end of the lower linkage assembly at a third axis;

a step connected to the lower linkage assembly and having a distal edge; and wherein in the lowered, open position, the left and right tailgate arms pivotally connect with the left and right step arms proximal the distal end of said step.

2. The apparatus for accessing the bed of a pickup truck of claim 1 further including second mounting means for providing variable connection between said lower linkage assembly and said step.

3. The apparatus for accessing the bed of a pickup truck of claim 1 further including first mounting means for providing variable connection between said upper linkage assembly and said lower linkage assembly.

4. An apparatus for accessing the bed of a pickup truck having a frame, a rear bumper and a tailgate having a distal edge and being hingedly mounted to the frame to move between an up, closed position and a lowered, open position, the apparatus comprising:
   a lower linkage assembly having first and second ends and being pivotally mounted at the first end to the rear truck bumper at a first axis;
   an upper linkage assembly having third and fourth ends and being pivotally mounted at the third end to and proximal the distal edge of the truck tailgate at a second axis, and being pivotally mounted at the fourth end to the second end of the lower linkage assembly at a third axis;
   a step connected to the lower linkage assembly and having a distal edge;
   second mounting means for providing variable connection between said lower linkage assembly and said step, said second mounting means including a plurality of holes being defined in both said lower linkage assembly and said step.

5. The apparatus for accessing the bed of a pickup truck of claim 4 wherein in the lowered, open position, at least a portion of said step extends rearwardly of the tailgate.

6. An apparatus for accessing the bed of a pickup truck having a frame, a rear bumper and a tailgate having a distal edge and being hingedly mounted to the frame to move between an up, closed position and a lowered, open position, the apparatus comprising:
   a lower linkage assembly having first and second ends and being pivotally mounted at the first end to the rear truck bumper at a first axis;
   an upper linkage assembly having third and fourth ends and being pivotally mounted at the third end to and proximal the distal edge of the truck tailgate at a second axis, and being pivotally mounted at the fourth end to the second end of the lower linkage assembly at a third axis;
   a step connected to the lower linkage assembly and having a distal edge; and
   wherein in the up, closed position said apparatus has a narrow profile proximal the tailgate and the distal edge of said step is between about 7 and 10 inches below the distal edge of the tailgate.

7. The apparatus for accessing the bed of a pickup truck of claim 6 further including quick release mounting means for enabling quick connection and release of said lower linkage assembly to the truck bumper and of said upper linkage assembly to the tailgate.

8. The apparatus for accessing the bed of a pickup truck of claim 7 wherein said quick release mounting means includes at least one pin assembly for connecting said lower linkage assembly to the truck bumper and at least one pin assembly for connecting said upper linkage assembly to the tailgate.

9. The apparatus for accessing the bed of a pickup truck of claim 8 wherein each pin assembly includes a quick release pin and a spring member for holding the pin in position as an axle for permitting said lower linkage assembly to pivot relative the truck bumper and for permitting said upper linkage assembly to pivot relative the tailgate.

10. The apparatus for accessing the bed of a pickup truck of claim 9 wherein there are two of said at least one pin assemblies connecting said lower linkage assembly to the bumper and there are two of said at least one pin assemblies connecting said upper linkage assembly to the tailgate.

11. The apparatus for accessing the bed of a pickup truck of claim 10 wherein each pin has a head and an opposing end each spring member has fifth and sixth ends, and wherein the spring member is pivotally held at the fifth end by the head of a corresponding pin and is configured to loop around and, against a spring bias, engage with and be releasably held at its sixth end by the opposing end of the corresponding pin.

12. The apparatus for accessing the bed of a pickup truck of claim 6 further including first mounting means for providing variable pivotal connection between said upper linkage assembly and said lower linkage assembly.

13. The apparatus for accessing the bed of a pickup truck of claim 12 wherein in the lowered, open position, the left and right tailgate arms pivotally connect with the left and right step arms at an angle of about 60 degrees.

14. The apparatus for accessing the bed of a pickup truck of claim 12 wherein said upper linkage assembly includes left and right tailgate arms and said lower linkage assembly includes left and right step arms, and wherein said first mounting means includes a plurality of holes defined in at least one of both the tailgate arms and both the step arms.

15. The apparatus for accessing the bed of a pickup truck of claim 14 wherein said first mounting means includes the plurality of holes being defined in both of both the tailgate arms and both the step arms.

\* \* \* \* \*